United States Patent [19]
Binion

[11] Patent Number: 5,718,194
[45] Date of Patent: Feb. 17, 1998

[54] IN-CYLINDER WATER INJECTION ENGINE

[76] Inventor: W. Sidney Binion, 2847 Panagard, Houston, Tex. 77082

[21] Appl. No.: 654,934

[22] Filed: May 28, 1996

Related U.S. Application Data

[63] Continuation of Ser. No. 304,128, Sep. 12, 1994, abandoned.

[51] Int. Cl.⁶ .................................................... F02B 47/02
[52] U.S. Cl. ........................... 123/25 C; 123/26; 123/562
[58] Field of Search ................................ 123/25 C, 26, 123/562, 563, 559.2

[56] References Cited

U.S. PATENT DOCUMENTS

| | | | |
|---|---|---|---|
| 3,177,633 | 4/1965 | McDonald, Jr. | 55/100 |
| 3,441,011 | 4/1969 | Karl | 123/122 |
| 3,608,529 | 9/1971 | Smith et al. | 123/25.2 |
| 3,672,341 | 6/1972 | Smith et al. | 123/119 E |
| 3,696,795 | 10/1972 | Smith et al. | 123/1 A |
| 3,817,232 | 6/1974 | Nakajima et al. | 123/568 |
| 3,961,609 | 6/1976 | Gerry | 123/1 A |
| 4,031,864 | 6/1977 | Crothers | 123/1 A |
| 4,069,794 | 1/1978 | Jordan | 123/25 A |
| 4,096,829 | 6/1978 | Spears | 123/25 J |
| 4,351,289 | 9/1982 | Renda | 123/25 A |
| 4,441,476 | 4/1984 | Roberts et al. | 123/542 |
| 4,448,153 | 5/1984 | Miller | 123/25 J |
| 4,461,245 | 7/1984 | Vinokur | 123/25 L |
| 4,480,616 | 11/1984 | Takeda | 123/425 |
| 4,502,420 | 3/1985 | Mezger | 123/25 |
| 4,553,504 | 11/1985 | Duggel et al. | 123/25 J |
| 4,558,665 | 12/1985 | Sandberg et al. | 123/25 C |
| 4,683,725 | 8/1987 | Sugiura | 62/199 |
| 4,960,080 | 10/1990 | O'Neill et al. | 123/254 |
| 5,051,113 | 9/1991 | Nemser | 123/26 |
| 5,081,977 | 1/1992 | Swenson | 123/527 |
| 5,099,802 | 3/1992 | Förster | 123/25 D |
| 5,125,366 | 6/1992 | Hobbs | 123/25 J |
| 5,148,776 | 9/1992 | Connor | 123/25 J |
| 5,170,751 | 12/1992 | Tosa et al. | 123/25 C |
| 5,237,964 | 8/1993 | Tomoiu | 123/25 C |
| 5,400,746 | 3/1995 | Susa et al. | 123/26 |
| 5,535,708 | 7/1996 | Valentine | 123/25 C |
| 5,540,191 | 7/1996 | Clarke | 125/25 C |

Primary Examiner—Erick R. Solis
Attorney, Agent, or Firm—Richard L. Moseley

[57] ABSTRACT

An environmental accommodating, reduced NOx, spark or plasma ignited, reciprocating, multi-fuel engine utilizing direct, in-cylinder water injection and an optional oxygen enriched air supply is able to operate as an ultra-lean burn, high compression ratio engine for notable power output and increased efficiency. The in-cylinder low-temperature water injection promotes numerous desirable effects. One, the in-cylinder water injection during compression stroke significantly lowers compression temperatures through the latent heat of vaporization of the liquid water to the gaseous form. The lower temperature of compression permits increased compression ratios while avoiding pre-ignition. As well, the low-temperature water injected air/fuel or enriched $O_2$/air/fuel mass demands less work in the compression stroke thereby increasing overall engine efficiency. The low-temperature water injection promotes increased mass flow through the engine for increased power output and efficiency. The low-temperature water injection also lowers temperature of combustion thereby lowering the formation of nitrogen oxide emissions. The optional enriched oxygen air supply can promote ignitibility and combustion flame stability in the presence of the high diluent water concentration and/or low or so called ultra lean fuel/air ratios, The process can be used on a two or four cycle engine, ignited by spark or plasma or any injection process.

9 Claims, 1 Drawing Sheet

IN-CYLINDER WATER INJECTION ENGINE

This application is a continuation of application Ser. No. 08/304,128, filed Sep. 12, 1994, now abandoned.

BACKGROUND OF THE INVENTION

1. Field of the Invention

The present invention relates to internal combustion engines in general and water injection engines in particular. Most particularly the invention relates to an internal combustion engine having water injected directly into the cylinder during the compression stroke to improve the efficiency by cooling the compression gases.

2. Related Art

Various fluids such as water and water in solution with other substances such as alcohol have been commonly injected into hydrocarbon fueled engines to provide improved engine operation. During the compression stroke, the water droplets vaporize and absorb heat energy produced within the combustion chamber to prevent pre-ignition. The vaporized water is subsequently heated by the burning fuel mixture during the power stroke and expands, increasing the mechanical efficiency of the combustion process. Beneficial side effects may include prevention of carbon buildup on the cylinder walls of the engine. As a result of the beneficial effects of the water injection, the engine is able to run more smoothly and efficiently on a leaner fuel mixture. Additionally, the reduction in peak combustion temperature reduces the formation of oxides of nitrogen and minimizes thermal stresses on the engine components.

Various types of devices have been developed to introduce fluids into the intake air of the internal combustion engine. These devices have included emulsion injection systems and intake air humidifiers in which air is passed through a volume of water before being introduced into the engine. Direct injection of the fluid into the intake air has been limited by the inability of mechanical systems to precisely meter a relatively small volume of water to obtain an optimum volumetric ratio of water in the final fuel/air charge. Humidified or direct water injected systems are impractical as the majority of the heat absorption capacity of the water lies in the phase transformation from liquid to gas.

Related art systems have not been entirely successful responses in engine requirements, largely due to the inability of purely mechanical devices to respond over a wide range in conditions. A method of supplying two different fluids to a common combustion chamber is described in U.S. Pat. No. 4,031,864 to W. T. Crothers. Water is used to achieve phase separation when methanol and gasoline are stored in a common tank, but are pumped from different levels within that tank. The primary purpose of that invention is to allow the use of different fuels.

A method of supplying water during peak power demand periods in an internal combustion engine is described in U.S. Pat. No. 4,351,289 to V. A. Renda. Water injection is carried out with water from a reservoir pressurized by an injection pump which is energized only above predetermined torque levels, under control of a vacuum switch sensing intake manifold vacuum.

A method of supplying water to an internal combustion engine for the purpose of allowing operation with leaner fuel mixtures is described by U.S. Pat. No. 4,461,245 to M. Vinokur. Intake manifold pressure is used to control the output of a water pump, thereby making the water injection rate responsive to engine load.

A method of providing water to the cylinders of turbocharged engines is described by U.S. Pat. No. 4,558,665 assigned to L. Sandbery. This system injects water into each manifold runner before each intake valve and is operated independently of the fuel system.

A system for water injection into internal combustion engines used to power generators is described by U.S. Pat. No. 4,960,080 to J. O'Neill, E. Schisler, and P. Kubo. The system is activated when the output of the generator reaches a predetermined level which is associated with the onset of NOx emissions by the drive motor.

A system for injecting water into internal combustion engines having a spark ignition system is described by U.S. Pat. No. 4,096,829 to G. Spears. The system operates a water injection pump at a rate proportional to engine RPM, where RPM is sensed inductively of one of the ignition wires. Water injection rate is controlled by air flow through an atomizer.

A system for injecting water into a carburetor to allow leaner fuel mixtures is described by U.S. Pat. No. 4,448,153 to R. Miller. A water injection pump is cycled on and off in response to such engine parameters as engine temperature, oil pressure and manifold pressure.

A system for coordinating water and fuel injection in the intake manifold is described by U.S. Pat. No. 5,148,776 to M. J. Connor. This system uses a computer to calculate fuel/air/water requirements for the engine.

None of the art cited above discloses water injected directly into the cylinder during the compression stroke nor the combination of water injection with enhanced oxygen.

ADVANTAGES OF THE INVENTION

The normal spark ignited turbocharged engine is a combination of the fuel-air Otto cycle and the air Brayton cycle. This compound cycle arrangement is an improvement of the basic Otto cycle in that partial compression (via the turbocharger) is removed from the cylinder. As well, mass flow and accompanying power output are augmented. However, the spark ignited compound engine still suffers in volumetric and combustion efficiency due to its common cylinder for both combustion and compression. Ideally, these processes should be optimized individually and in separate chambers such as occurs in the Brayton cycle gas turbine engine. The compound cycle does in fact offer a degree of separation and optimization but is still limited to an engineering and hence, in-cylinder thermodynamic compromise. The present invention solves the thermodynamic disparity by optimizing the compression and combustion/expansion thermodynamic processes independently for an over all efficiency and power output gain. These processes are implemented in a modified compound turbocharged reciprocating engine with mechanical and thermodynamically significant enhancements.

The present engine cycle is in fact a new cycle and an improvement over the conventional compound cycle. It adds water and optionally, oxygen, to the cycle for improvements in mass flow, volumetric efficiency, combustion efficiency, combustion temperature, flame stability, ignitibility, as well as reductions in fuel consumption and oxides of nitrogen or NOx production.

The conventional spark or plasma ignited engine is limited in efficiency due to: 1) a lower compression ratio to preclude pre-ignition 2) ineffective mitigation of the temperature rise within the compression stroke 3) ineffective mitigation of the work of compression 4) a constant mass in the chamber upon inlet valve closure with increasing temperature on compression 5) the limitation of the percentage oxygen in air.

The conventional spark or plasma ignited engine compression ratio limitation exists due to the rising temperature of the air or fuel-air mixture during the compression stroke and the impending incidence of thermally induced pre-ignition. Efficiency in an engine is a strong function of compression ratio. However, because of the pre-ignition limitation the conventional spark/plasma ignited engine is unable to take advantage of the high efficiency high compression ratios such as occurs in the diesel cycle. An injection of in-cylinder, low-temperature and/or atomized water before and/or during the compression stroke will phase change the water to gas via absorption of the ambient heat flux (water's latent heat of vaporization), precluding thermally induced pre-ignition.

The conventional spark or plasma ignited engine does not inherently possess an effective method for mitigating heat flux temperature rise during the compression cycle. During the compression stroke, the gaseous mass within the cylinder rises in temperature due to 1) convection heating and radiation heating from cylinder walls, heads, piston crowns, valves, etc. 2) the adiabatic or polytropic heating due to the piston compressing a volume of gas. The normal spark/plasma ignited engine does not have an effective mechanism for mitigating temperature rise during the compression stroke or cycle due to the aforementioned heating phenomena. An in-cylinder injection of low-temperature and/or atomized water before and/or during the compression stroke will absorb heat flux emanating from cylinder sources and absorb compression work heat. The water will phase change to gaseous steam mitigating total in-cylinder mass temperature rise. In other words, the final temperature of the compressed mass (consisting of water/air/fuel or water/augmented $O_2$ air/fuel) at the end of the compression stroke will be significantly lower as result of water injection. This final compression stroke temperature will be below the thermal ignition point of the compressed mass mixture, thereby precluding pre-ignition.

An engine which directly, or in-cylinder injects its fuel and is also spark/plasma (or otherwise not compression ignited) also will benefit by in-cylinder compression stroke water injection. In this cycle, the water injected/air mass is held below ignition temperature so that the injected fuel does not pre-ignite or light off.

The conventional spark or plasma ignited engine does not inherently possess an effective method for mitigating the work of compression during the compression cycle. An in-cylinder injection of low-temperature and/or atomized water before and/or during the compression stroke will phase change the water to gas via absorption of the ambient heat flux (water's latent heat of vaporization) thereby dropping the temperature or mitigating the temperature of of the in-cylinder mass the compressed mass. As temperature is dropped or mitigated, proportionally. compression work is decreased.

The conventional spark/plasma (or otherwise not compression ignited) engine is in general, a constant mass cycle. Upon closure of the intake valves, the mass of the cylinder is constant during the compression stroke. An addition of a diluent such as water during the compression stroke, adds to the total mass through put, increasing power output. The increased power output from the compression stroke water injection is derived as increased water mass/momentum against the piston during the expansion stroke for increased power output and efficiency. An injection of pressurized or differentially pressurized water during compression will not only mitigate compression stroke temperatures but will add also to the total power output of the engine due to a differential increase (by differential injection of mass) throughput into the engine cycle.

The conventional spark or plasma ignited engine is lower bounded in its fuel/air ratio by the percentage oxygen in air. The limitation of percentage of oxygen in air, nominally 21% at sea level, ultimately fixes the lower lean limit for a fuel/air ratio. Until recent times and the advent of relatively high efficiency static membrane oxygen generators, the use of supplemental oxygen for enhanced combustion has been uneconomic. With static membrane generators, exhaust driven turbochargers, and a pressure recovery turbine, the energy penalty for production of the enhanced oxygen airstream is minimized while the lean limit of the fuel/air ratio is expanded, thereby increasing overall engine efficiency.

Related art in water injection in spark or plasma ignited engines, while notable for improvements in the cycle, have limitations in 1) absolute humidity levels 2) rate of vaporization of water 3) volumetric efficiency. Various types of devices have been developed to introduce fluids into the intake air of internal combustion engines. These devices have included emulsion injection systems, intake air humidifiers and intake manifold injectors.

Devices which inject water into the intake manifold primarily affect humidification and densification of the air charge before the compression stroke. These systems are notable for depression of inlet air temperature and humidification to near 100% relative humidity levels. However, absolute humidity is a function of temperature. Intake manifold humidification is limited to a lower level of absolute humidification than in-cylinder low-temperature and/or atomized water injection, since the former occurs at a lower temperature while the latter occurs within a higher temperature profile, the temperature, increasing as the compression stroke increases its compression ratio. The higher temperatures within the compression stroke permit a greater mass of water (higher absolute humidity) to carried in the compressed mass without formation of droplets or high relative humidities which may interact with oil lubricants on cylinder walls thereby defeating some of the wall lubricating properties. The current invention can direct a high pressure spray of either low-temperature and/or atomized water into the relatively hot freeboard space above the piston to produce a modest relative humidity but a significantly higher absolute humidity as compared to the intake manifold humidification systems.

Water injection in the intake manifold whether by atomization, direct stream, or entrained droplets ultimately induced into the cylinder, are all subject to an evaporation rate proportional to the temperature and the relative humidity of the ambient gas mass. Intake manifold atomization, while possessing the highest manifold evaporation rates, is subject to a relative humidity maximum of 100% beyond which water is not evaporated but is being introduced into the cylinder with concomitant untoward results in interaction with cylinder wall lubricants. Intake manifold direct stream or entrained water droplets can inject water but can also suffer four ill effects: 1) water-to wall lubricant interaction and its compromise on the lubrication system; 2) premature phase change to steam due primarily to head conduction impact on the intake valve or impact on the cylinder wall; 3) pooling of water on the piston with consequent phase change to steam due primarily to heat conduction from the piston crown. (The steam now produced will be subjected to the full work of compression and will be unavailable to mitigate compression temperatures or compression work); 4) liquid water displacement of the gaseous mass in the cylinder induced air charge reducing volumetric efficiency. In contrast, the current invention directs low-temperature or atomized water into the freeboard space above the piston which more rapidly evaporates due to higher compression stroke temperatures (as opposed to the lower intake manifold temperatures). As well, the heat absorbed by the injected in-cylinder water is almost completely derived from the compressed gas mass, thereby positively affecting the thermodynamics and combustion dynamics of the cycle. The volumetric efficiency of the engine is maximized vis a vis manifold injection as the in-cylinder water injection cycle receives the maximum density gaseous charge into the cylinder and then adds additional water mass to this in-cylinder charge, further increasing its density.

Water injection humidifiers in the intake manifold lower manifold temperatures and densify the gas stream. However, the intake manifold humidification has some limitations which affect volumetric efficiency in the following ways: 1) at a given temperature, dry air has a greater density than the combination of air and moisture at that same temperature; 2) humidity systems are limited to temperatures which must be above freezing or ice point of the inlet gas stream in order to avoid ice ingestion into the cylinder. The current invention uses coolers (heat exchangers) to intercool the intake gas stream, thereby providing the highest density charge to the cylinder chamber. This charge is further densified by the in-cylinder low-temperature and/or atomized water injection into the freeboard space above the piston and the gas charge is densified as well by the accompanying compression by the piston. The net effect of heat exchangers plus in-cylinder, low-temperature and/or atomized water provides the highest density charge for water systems to date and significantly increases volumetric efficiency.

SUMMARY OF THE INVENTION

The present invention is an non-constant mass, optionally enhanced oxygen atmospheric air, high compression, spark/plasma ignited internal combustion engine cycle. To date no known implementation of this cycle exists. Hence, the cycle represents a new cycle.

The present invention includes an engine of at least one cylinder complete with intake/exhaust manifolds and valves, a method of igniting the fuel-air or fuel-enhanced-oxygen-air mixture, an injector/or injectors for dispensing the fuel, two turbochargers, one nitrogen pressure recovery turbine/compressor, three aftercoolers, injectors for atomized or other forms of low-temperature water delivery and oxygen/nitrogen gas separator membranes. The water injection system includes a pressurized water supply and a means for timing and metering the amount of water to be injected at precise time intervals and at precise pressures.

The present invention operates as follows. The inlet air charge is formed from two sources—a filtered ambient air stream and an high oxygen (enriched) content air stream. The total inlet air stream is compressed by a nitrogen pressure recovery turbine/compressor and discharged to a conduit extension of the intake manifold. Since the air stream is both pressurized and heated, due to the work of the turbine/compressor, the airstream must be cooled to increase charge density and reduce work the of the following turbocharger compressor. To that end an aftercooler heat exchanger is supplied, the net of which also increases the mass flow into the engine. The following turbocharger pressure boosts the air stream or enhanced oxygen airstream, discharging through an after cooler to a conduit tee. One leg of the tee goes to a second turbocharger/aftercooler combination and on to the nitrogen/oxygen separators. On the other leg of the tee, gaseous fuel is injected and mixed in the intake manifold. The cool fuel gas further depresses the intake charge temperature and increases density. The fuel-air or fuel-enhanced-oxygen-air mixture enters into the cylinder through the intake manifold and the intake valve. In the present invention, the intake valves are insulated with a high thermal resistance coating reducing heat flux to the fuel-air mixture. The result is that the fuel-air mixture enters the cylinder at a higher density thereby increasing the engine volumetric efficiency.

Upon entering the cylinder, the fuel-air or fuel-enhanced-oxygen-air mixture begins to absorb heat rapidly. This increase in temperature of the mixture is undesirable. Efficiency is sacrificed due to increased piston work requirements to compress the hotter gases. Therefore during the compression stroke, a water injection system injects high pressure, low temperature atomized water into the cylinder, mitigating this heat flux. As a result, the work of compression is reduced due to the decreased fuel-air or fuel-enhanced-oxygen-air mixture temperature and pressure. Furthermore, the injection of cooling water works to reduce the temperature of the fuel-air or fuel-enhanced-oxygen-air mixture below the pre-ignition temperature during compression, thereby allowing a higher, more efficient compression ratio. The lower temperature of compression along with the head absorption capacity of the water translate to a lower combustion temperature. Lower combustion temperatures translate into lower NOx emissions.

The optional nitrogen/oxygen static membrane separation system operates optimally at higher pressure. To this end, the second turbocharger and the nitrogen pressure recovery turbine/compressor are part of the cycle if the enhanced oxygen air stream is to be used. Also, membrane efficiency is increased to recycling of the enhanced oxygen air stream, i.e., the higher oxygen content of the applied gaseous stream to the membrane increases the permeate flow, which in this case is the enriched oxygen stream applied to the suction side of the high pressure nitrogen driven pressure recovery turbine/compressor. The suction side of the nitrogen pressure recovery compressor operates at a partial vacuum, thereby reducing back pressures on the static membrane nitrogen/oxygen generators and significantly increasing their oxygen generating efficiency.

The goal of the present invention is to increase operational thermodynamic efficiency and reduce NOx emissions by increasing the compression ratio and optionally increasing the oxygen content of the air supply. This goal can be achieved by the following objectives of the project: 1) allow operation at a higher compression ratio by utilizing water injection to mitigate the associated high compression temperatures; 2) optionally increase the oxygen content of the air supply by utilizing a nitrogen/oxygen gas separator membrane.

DESCRIPTION OF THE PREFERRED EMBODIMENT

Figure 1:
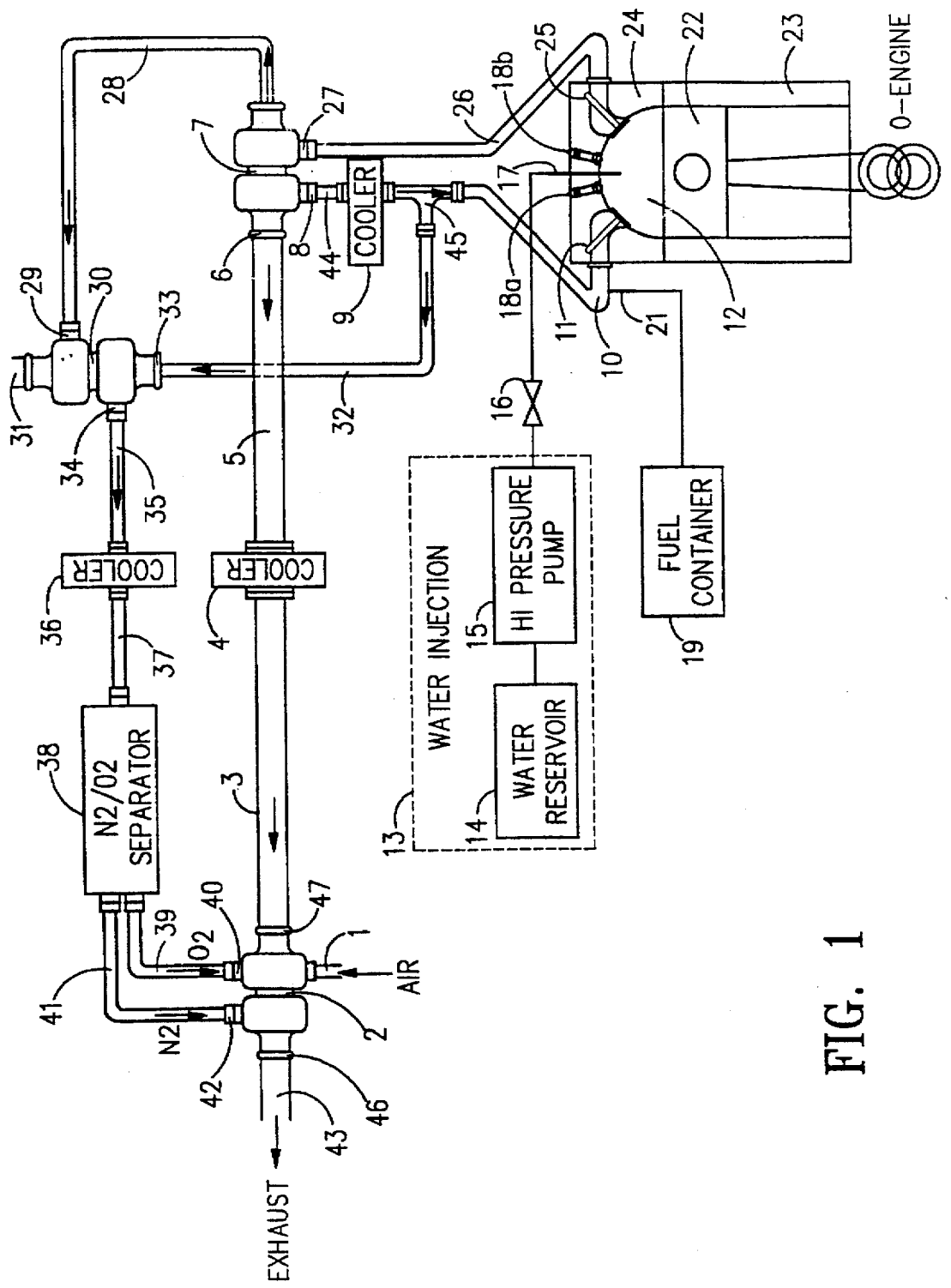
FIG. 1 is a schematic representation of the overall operation of the water injection system with optional enhanced oxygen static membrane generators.

The present invention provides for improving the efficiency of an internal combustion engine by use of an in-cylinder water injection system and an optional augmented oxygen static membrane system. The present invention is comprised of:

(a) an internal combustion engine having at least one combustion chamber, at least one cylinder head secured to said combustion chamber and at least one piston disposed within said combustion chamber;

(b) an air/fuel intake manifold in fluid communication to said combustion chamber through said cylinder head;

(c) at least one water injector in fluid communication to said combustion chamber;

(d) a constant pressure water source connected to said water injector by a conduit;

(e) a valve in said conduit responsive to an electronic signal to open and let water flow to said water injector during the compression cycle of said piston;

(f) an air intake conduit connected to said air/fuel intake manifold;

(g) an exhaust manifold connected to said combustion chamber:

(h) an exhaust conduit connected to said exhaust manifold;

(i) at least one turbocharger compressor operatively connected to said exhaust conduit and said air intake conduit to compress the intake air in said air intake conduit;

(j) a bank of nitrogen/oxygen static separation membranes connected to said air intake conduit by a membrane conduit and connected to air/fuel intake manifold by an enriched air conduit to remove a portion of the nitrogen in the intake air prior to said air/fuel intake manifold;

(k) a second turbocharger compressor operatively connected to said exhaust conduit and said membrane conduit to compress the air passing to said bank of nitrogen/oxygen membranes;

(l) a second turbocharger compressor after cooler heat exchanger between said second turbocharger and said bank of nitrogen/oxygen membranes; and (m) a nitrogen exhaust conduit connected to said bank of nitrogen/oxygen static membranes; and (n) a pressure recovery turbine operatively connected to said exhaust conduit and said nitrogen exhaust conduit to drive a compressor operatively connected to said air intake conduit and enriched air conduit to compress the air flowing to said air/fuel intake manifold.

The present invention is a new cycle for a two or four stroke internal combustion engine as shown in FIG. 1 which is a schematic representation of the overall operation of the water injection system with the optional enhanced oxygen static membrane generators.

The engine 0 includes at least one thermally treated piston 22 with a yttria-zirconium coating for reduced heat transfer to the piston crown. The engine also includes at least one cylinder head 24 with at least one combustion chamber 12 which is equipped with up to two sparkplugs 18a and 18b, at least one intake valve 11, at least one exhaust valve 25, and one water injector 17 each per cylinder. The intake and exhaust valves 11 and 25 and engine head 24 facing the combustion chamber 12 of each cylinder is coated with yttria-zirconium up to, but not including the valve seats. The intake manifold 10 is fitted with a fuel injector 21 while the head 24 is fitted with water injector 17.

The invention further comprises two turbochargers 7 and 30, one pressure recovery turbine 3, three after coolers 4, 9 and 36. a nitrogen/oxygen gas separator membrane 38, a water injection pump and reservoir 13, and a fuel container 19. Each turbocharger or pressure recovery turbine has a compressor and turbine respectively. Each of the turbines operate off either the exhaust gases or nitrogen purge and drive the compressors by a common shaft.

Ambient air enters pressure recovery compressor inlet 1. Low pressure enriched oxygen content air stream enters pressure recovery inlet 40 where it is mixed proportionally with ambient air. The mixing of the ambient air and the low pressure enriched oxygen content air in the pressure recovery compressor 2 creates a pressurized, enhanced oxygen air stream which exits the pressure recovery compressor outlet 47 and enters conduit 3. The enhanced oxygen air stream enters aftercooler 4 to be cooled after the work of compression of the pressure recovery turbine 2 exiting to conduit 5. Aftercooling is necessary to increase the efficiency of compressors and increase the density of the compressor discharge. The enhanced oxygen air stream goes to turbocharger 7 where it enters turbocharger inlet 6, is compressed, and exits through outlet 8. The compressor outlet 8 of turbocharger 7 is connected via conduit 44 to an aftercooler 9 to be cooled after the work of compression of turbocharger 7. The outlet of the aftercooler 9 is connected to the compressor inlet 33 of turbocharger 30 via tee 45 and conduit 32 and also to intake manifold 10 via tee 45. The further compression by turbocharger 30 to a higher pressure is required for efficient operation of the nitrogen/oxygen separator 38. The compressor outlet 34 of turbocharger 30 is connected to aftercooler 36 via conduit 35 to be cooled after the work of compression of turbocharger 30. The removal of heat due to the work of compression is necessary to protect the separator membranes. The outlet of aftercooler 36 is connected to the inlet of the nitrogen/oxygen separator 38 via conduit 37 where high pressure nitrogen is extracted through conduit 41. The separator 38 comprises a bank of static membranes consisting of hollow polymer fibers which effect the separation of oxygen from nitrogen. The high pressure nitrogen enters pressure recovery turbine inlet 42 and is the driving force for pressure recovery turbine 2. After the nitrogen expends its pressure and flow energy as mechanical compression work, it exits through pressure recovery turbine exit 47 as exhaust 43. The low pressure enriched oxygen air stream outlet from the nitrogen/oxygen separator 38 is connected via conduit 39 to the inlet compressor 40 for pressure recovery turbine 2. This high oxygen content or enriched oxygen air stream is the one previously mentioned that flows through conduit 39 an mixes with the filtered ambient air to yield and oxygen enhanced air stream at pressure recovery compressor outlet into conduit 3.

Gaseous fuel is injected through injector 21 and mixed with the pressurized air or enhanced oxygen air in the intake manifold 10. The cool gaseous fuel further depresses the intake charge temperature. The compressed fuel-air or fuel-enhanced-oxygen-air mixture enters into the combustion chamber 12 through intake valve 11. The intake valve base is insulated with a high thermal resistance yttria-zirconium coating reducing the heat flux to the fuel-air mixture. The coating also preserves valve life in high temperature operation. The result of the measures taken above is that the fuel-air mixture enters the cylinder at a lower than normal temperature and thus at a higher density, thereby increasing the engine volumetric efficiency.

Upon entering the combustion chamber 12, the fuel-air mixture begins to increase in temperature rapidly. This increase in the temperature of the fuel-air or fuel-enhanced-oxygen-air mixture is caused by a combination of heat of convection and radiation heat from the combustion chamber walls. Upon closure of intake valve 11 the temperature of the fuel-air or fuel-enhanced-oxygen-air mixture rises further due to the work of compression of the piston stroking towards top dead center. Therefore, during the compression stroke valve 16 opens to inject high pressure atomized water into the combustion chamber 12 through injector 17. The injected water will rapidly evaporate and mitigate the excessive temperature rise. As a result the work of compression is reduced due to the decreased fuel-air or fuel-enhanced-oxygen-air mixture temperature and pressure. Furthermore, the injection of cooling water works to keep the temperature od the fuel-air or fuel-enhanced-oxygen-air mixture below the dieseling temperature during compression thereby eliminating pre-ignition. The in-cylinder gaseous mass is also increased by the amount of water injected which translate to increased power output from the engine. The injection of pressurized or differentially pressurized water during compression will increase mass/momentum against the piston during the expansion stroke for increased power output and efficiency. As well, the in-cylinder water injection decreases the adiabatic combustion temperature due to the end of compression stroke being reduced by the water injection and the greater absorption of the heat of combustion by the increased inert mass of which water is a constituent.

Because of the measures taken above, the compression ratio of the present invention can be raised to as high as that for a normal diesel engine. This is beneficial since the net efficiency of combustion engines is affected by the compression ratio. The fuel-air mixture at the end of the compression stroke is a high pressure, relatively low temperature, oxygen enriched, higher water vapor content, lower nitrogen content mixture as compared to conventional spark/plasma ignited engines. The combustion process is initiated by firing spark plugs 18a and 18b with high voltage pulse trains. With this process, ignition of the ultra-lean fuel-air mixture is enhanced and will preclude misfires.

During combustion the relatively high concentration of oxygen of the in-cylinder gaseous mass increases flame speed and stability, with a resulting increased in efficiency. The increase water content of the gaseous mass results in lower adiabatic flame temperature which reduces the oxides of nitrogen or NOx production which is a strong function of temperature. The increase in water content decreases the in-cylinder gaseous relative nitrogen content, again, thereby decreasing the engine cycle's propensity to form NOx. The increase in oxygen content will increase the engine cycle NOx but because of the aforementioned water effects, the overall cycle will decrease in NOx emissions as opposed to a similarly configured spark/plasma ignited engine with lower compression ratio and no in-cylinder water injection.

The expansion cycle or power stroke is improved in the present invention in part due to the reduced heat flux within the insulated chamber. The combustion chamber head 24, and piston 22, the valves 11 and 25 are thermal resistively coated. Reduced heat flux through the piston to the water jackets in the cylinder head and to the valves through the combustion chamber improves combustion efficiency. Also with the increase in available energy from higher pressures related to the higher compression ratio and the increase in mass flow from the water addition, the expansion cycle or power stroke is significantly improved over the conventional engine.

The exhaust stroke contains a high temperature, increased mass, higher pressure exhaust charge than the conventional spark/plasma ignited engine. This higher energy exhaust charge exits the engine via the exhaust manifold 26, which is insulated to preserve energy, and enters turbine inlets 27 and 29 through conduits 26 and 28 respectively to drive the turbines of turbochargers 7 and 30 respectively. The higher energy exhaust charge means increased power to the turbochargers which are outfitted with high temperature impellers. Utilizing the high temperature exhaust charge preserves the high frequency components of the exhaust pulse thereby increasing turbocharger and engine efficiency.

The invention claimed is:

1. An in-cylinder water injection engine comprising:
   (a) an internal combustion engine having at least one combustion chamber, at least one cylinder head secured to said combustion chamber and at least one piston disposed within said combustion chamber:
   (b) an air/fuel intake manifold in fluid communication to said combustion chamber through said cylinder head;
   (c) at least one water injector in fluid communication to said combustion chamber;
   (d) a constant pressure water source connected to said water injector by a water conduit;
   (e) a valve in said water conduit responsive to the compression cycle of the engine to open and let water flow to said water injector during each compression cycle of said engine;
   (f) a bank of nitrogen/oxygen static membranes connected to said air intake conduit by a membrane conduit and connected to said air/fuel intake manifold by an enriched air conduit to remove a portion of the nitrogen in the intake air prior to said air/fuel intake manifold; and
   (g) a turbocharger compressor operatively connected to said exhaust conduit and said membrane conduit to compress the air passing to said bank of nitrogen/oxygen membranes.

2. The in-cylinder water injection engine according to claim 1 further comprising an air intake conduit connected to said air/fuel intake manifold, an exhaust manifold connected to said combustion chamber, an exhaust conduit connected to said exhaust manifold and at least one turbocharger compressor operatively connected to said exhaust conduit and said air intake conduit to compress the intake air in said air intake conduit.

3. The in-cylinder water injection engine according to claim 2 further comprising a turbocharger compressor after cooler heat exchanger between said turbocharger and said air/fuel intake manifold.

4. The in-cylinder water injection engine according to claim 1 further comprising a second turbocharger compressor after cooler heat exchanger between said second turbocharger and said bank of nitrogen/oxygen membranes.

5. The in-cylinder water injection engine according to claim 4 further comprising a nitrogen exhaust conduit and a pressure recovery turbine operatively connected to said exhaust conduit and said nitrogen exhaust conduit to drive a compressor operatively connected to said air intake conduit and enriched air conduit to compress the air flowing to said air/fuel intake manifold.

6. An in-cylinder water injection engine comprising:
   (a) an internal combustion engine having at least one combustion chamber, at least one cylinder head secured to said combustion chamber and at least one piston disposed within said combustion chamber;
   (b) an air/fuel intake manifold in fluid communication to said combustion chamber through said cylinder head;
   (c) at least one water injector in fluid communication to said combustion chamber;
   (d) a constant pressure water source connected to said water injector by a conduit;

(e) a valve in said conduit responsive to an electronic signal to open and let water flow to said water injector during the compression cycle of said piston;

(f) an air intake conduit connected to said air/fuel intake manifold;

(g) an exhaust manifold connected to said combustion chamber:

(h) an exhaust conduit connected to said exhaust manifold;

(i) at least one turbocharger compressor operatively connected to said exhaust conduit and said air intake conduit to compress the intake air in said air intake conduit;

(j) a bank of nitrogen/oxygen static membranes connected to said air intake conduit by a membrane conduit and connected to air/fuel intake manifold by an enriched air conduit to remove a portion of the nitrogen in the intake air prior to said air/fuel intake manifold; and (k) a second turbocharger compressor operatively connected to said exhaust conduit and said membrane conduit to compress the air passing to said bank of nitrogen/oxygen membranes.

7. The in-cylinder water injection engine according to claim 6 further comprising a second turbocharger compressor after cooler heat exchanger between said second turbocharger and said bank of nitrogen/oxygen membranes.

8. The in-cylinder water injection engine according to claim 7 further comprising a nitrogen exhaust conduit and a pressure recovery turbine operatively connected to said exhaust conduit and said nitrogen exhaust conduit to drive a compressor operatively connected to said air intake conduit and enriched air conduit to compress the air flowing to said air/fuel intake manifold.

9. An in-cylinder water injection engine comprising:

(a) an internal combustion engine having at least one combustion chamber, at least one cylinder head secured to said combustion chamber and at least one piston disposed within said combustion chamber;

(b) an air/fuel intake manifold in fluid communication to said combustion chamber through said cylinder head;

(c) at least one water injector in fluid communication to said combustion chamber;

(d) a constant pressure water source connected to said water injector by a conduit;

(e) a valve in said conduit responsive to an electronic signal to open and let water flow to said water injector during the compression cycle of said engine;

(f) an air intake conduit connected to said air/fuel intake manifold;

(g) an exhaust manifold connected to said combustion chamber:

(h) an exhaust conduit connected to said exhaust manifold;

(i) at least one turbocharger compressor operatively connected to said exhaust conduit and said air intake conduit to compress the intake air in said air intake conduit;

(j) a bank of nitrogen/oxygen static membranes connected to said air intake conduit by a membrane conduit and connected to said air/fuel intake manifold by an enriched air conduit to remove a portion of the nitrogen in the intake air prior to said air/fuel intake manifold;

(k) a second turbocharger compressor operatively connected to said exhaust conduit and said membrane conduit to compress the air passing to said bank of nitrogen/oxygen membranes;

(l) a second turbocharger compressor after cooler heat exchanger between said second turbocharger and said bank of nitrogen/oxygen membranes; and (m) a nitrogen exhaust conduit connected to said bank of nitrogen/oxygen static membranes; and (n) a pressure recovery turbine operatively connected to said exhaust conduit and said nitrogen exhaust conduit to drive a compressor operatively connected to said air intake conduit and enriched air conduit to compress the air flowing to said air/fuel intake manifold.

* * * * *